March 26, 1963 E. G. SUNDBERG 3,083,253
METHOD AND APPARATUS FOR ELECTROLYTE CIRCULATION
Filed Dec. 26, 1961 4 Sheets-Sheet 1

INVENTOR.
ERIK GUSTAV SUNDBERG
BY
Strauch, Nolan & Neale
ATTORNEYS

March 26, 1963 E. G. SUNDBERG 3,083,253
METHOD AND APPARATUS FOR ELECTROLYTE CIRCULATION
Filed Dec. 26, 1961 4 Sheets-Sheet 2

INVENTOR.
ERIK GUSTAV SUNDBERG
BY
Strauch, Nolan + Neale
ATTORNEYS

March 26, 1963 E. G. SUNDBERG 3,083,253
METHOD AND APPARATUS FOR ELECTROLYTE CIRCULATION
Filed Dec. 26, 1961 4 Sheets-Sheet 3

INVENTOR.
Erik Gustav Sundberg

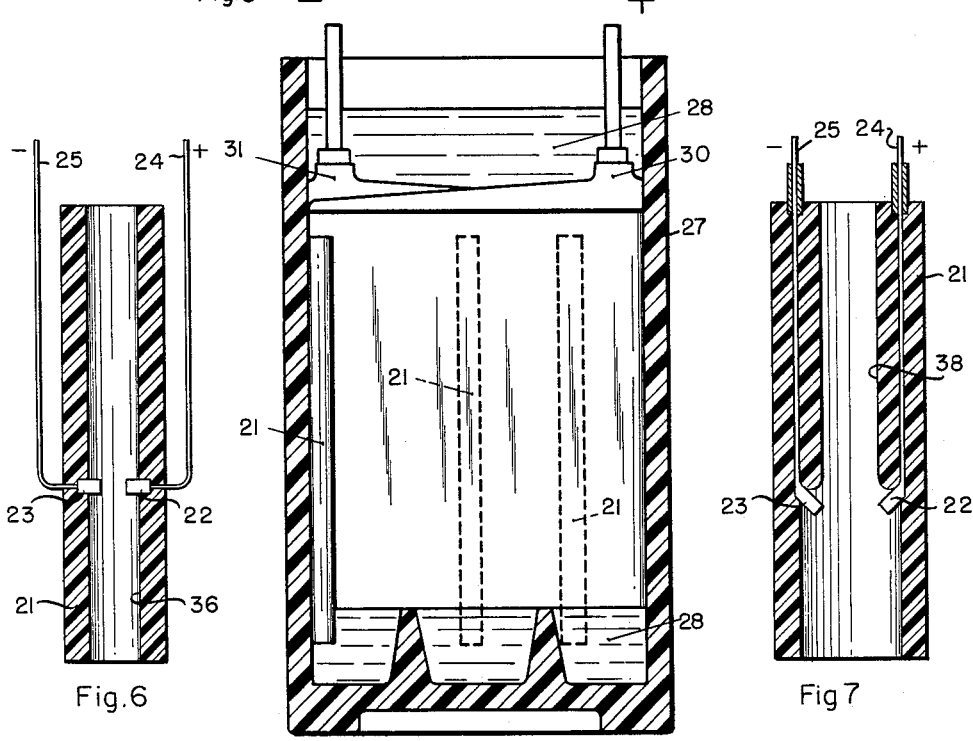
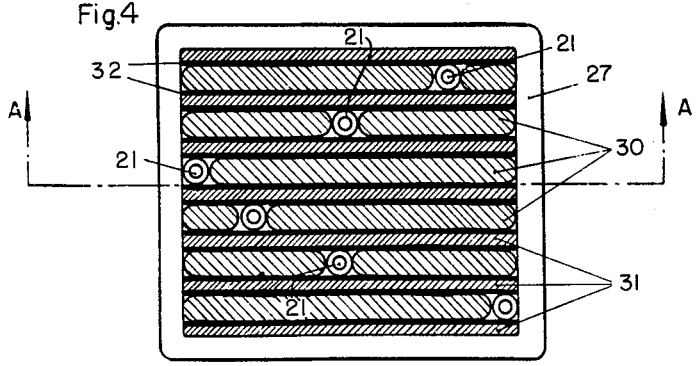

United States Patent Office 3,083,253
Patented Mar. 26, 1963

3,083,253
METHOD AND APPARATUS FOR ELECTROLYTE CIRCULATION
Erik G. Sundberg, Nol, Sweden, assignor to Aktiebolaget Tudor, Stockholm, Sweden, a corporation of Sweden
Filed Dec. 26, 1961, Ser. No. 162,164
8 Claims. (Cl. 136—160)

The present invention relates to galvanic cells and more particularly to improvements in the circulation of electrolyte in electric storage batteries. This application is a continuation-in-part of my two copending application Serial Nos. 849,048 and 849,052, both filed October 27, 1959, and now abandoned.

In an effort to provide higher capacity and especially higher short time discharge capacity, cells comprising a tight assembly of electrodes and separators, which at the same time have been made thinner in order to accommodate as many electrodes as possible in one cell, have been developed. This tight arrangement of electrodes and separators results, however, in insufficient electrolyte circulation resulting in reduced cell voltage. The insufficient change or circulation of electrolyte between electrodes reduces distribution of heat and electrochemical reactions and thus largely offsets the advantages of a tight assembly of thin electrodes and separators in compact batteries. Through the present invention, the problem of electrolyte circulation from above and below the electrodes to replace the electrolyte between the electrodes when the discharge of the cell is started is solved in such compact batteries in a new, easy and reliable manner.

It has been suggested heretofore to blow air into the battery cell to produce a certain amount of electrolyte movement. An example of such prior effort is set forth in U.S. Patent No. 2,584,117 to Elrod. By this procedure, however, undesirable aeration of the electrolyte is effected and the movement of the electrolyte is not sufficient and only insignificantly affects the electrolyte at the regions between the electrodes. The use of mammoth pumps driven by compressed air as heretofore proposed to produce more uniform distribution of air to and electrolyte circulation in each storage battery cell represent a serious disadvantage for installations where space is at a premium as in submarines.

A major object of the present invention is to provide a novel method of and apparatus for producing electrolyte circulation in a storage battery by locating a conduit having an open end extending to a position closely adjacent the bottom of the electrolyte container, and producing pulsating charges of gas at a rate such that the charges form individual bubbles which completely fill the cross sectional area of the conduit. These bubbles thereby cause a pumping action without harmful aeration of the electrolyte; when the upper end of the conduit is below the level of the electrolyte an effective pumping action is achieved with relatively small energy requirements.

In one form of the present invention, such fluid driven electrolyte lift pumps, which are incorporated inside the electrolyte container, are provided with impulses of air. Where as in a submarine several battery cells are used at side by side locations, the lift pumps may be hydraulically connected in parallel to a main driving arrangement, which together with the former form a closed circuit. The mechanical motive power to the hydraulic main driving arrangement may be taken from a suitable motor, such as an electric solenoid or motor, or the like, to power and move a piston in a hydraulic cylinder or a diaphragm in a diaphragm type hydraulic pressure generating device or pressure box.

It is, therefore, another object of the present invention to provide a compact means for effecting uniform electrolyte circulation between the electrodes of the cells of a compact storage battery.

A further object is to provide an improved compact pneumatically actuated electrolyte pumping device which is operative to produce uniform electrolyte circulation between the electrodes of the cells of a storage battery.

Where there is inefficient circulation of the electrolyte through the entire cell, separators and electrodes often become overheated to such a degree that the life of the cell is shortened. To avoid overheating, the discharge rate must be kept at relatively low values which in turn results in a low short-time capacity. It is, however, often of very great importance for electric storage batteries to have high short-time capacities as for example, in the case where batteries are used in submarines.

It is accordingly another object of the present invention to provide an electric cell having a liquid electrolyte, which comprises one or more electrolytic cells and which, during discharging of the electric cell, produce gas which stirs the electrolyte in the electric cell.

Preferably each electrolytic cell has a plurality of vertical ducts in the electrolyte as discussed above which may be a tube shaped body of electrical insulating, electrolyte-resistant material having an inlet opening located just above the bottom of the electric cell and an outlet opening for electrolyte and gas located just below the surface of the electrolyte in the filled electric cell. A pair of electrodes are positioned in the duct and supplied with a voltage to cause gas generation by electrolysis of the electrolyte, the voltage being supplied by a circuit that is energized during the time the battery cells are being discharged.

These and other objects of the present invention will become more fully apparent by reference to the appended claims and as the following detailed description proceeds in reference to the accompanying drawings wherein:

FIGURE 4 is a plan view of a battery cell showing the disposition of a plurality of electrolyte pumps throughout the battery;

FIGURE 5 is a vertical section taken along line A—A of FIGURE 4 through an electric cell incorporating the pump of FIGURE 3; and FIGURES 6 and 7 are vertical sections through alternative constructions of the electrolyte pump.

Figure 1:
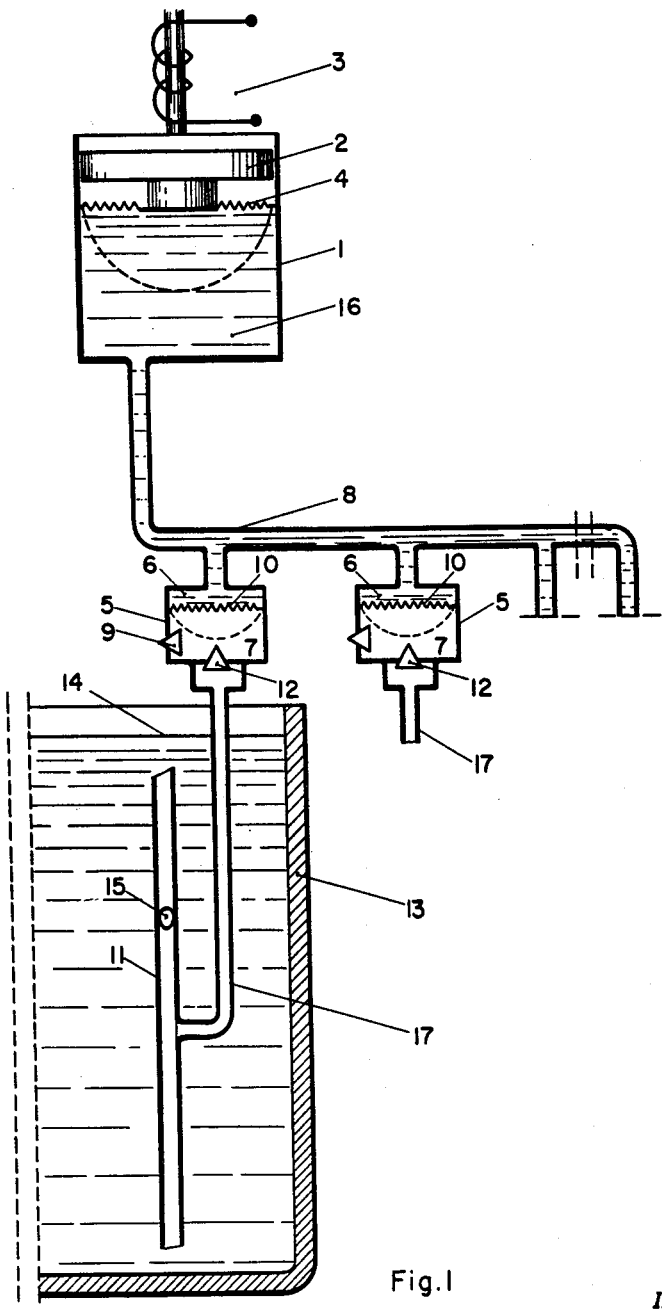
FIGURE 1 is a diagrammatic illustration of a first embodiment of the invention in which a common source of hydraulic motive power is utilized to actuate in parallel a plurality of hydraulically actuated pneumatic pumps individually associated with separate cells of one or more storage batteries.

Referring first to FIGURE 1, the source of hydraulic motive power comprises a hydraulic pressure generating device or pressure box comprising a hydraulic main cylinder 1 having a piston 2 mounted in the top thereof and magnetically associated with a solenoid type motor 3 and an impervious diaphragm 4 fixed in fluid tight relation at its periphery to the internal wall of the cylinder 1 and its center to the depending boss on the bottom of the piston 2. When the solenoid is energized, the piston 2 and diaphragm 4 are lifted by magnetic attraction of the piston 2 to or slightly above the positions in which the piston 2 and diaphragm 4 illustrated in FIGURE 1. When solenoid 3 is de-energized, piston 2 is released from its magnetic support and due to its weight moves downwardly to the limit of its downward travel to depress diaphragm 4 approximately to the position indicated by the arcuate dotted line in FIGURE 1.

The hydraulic pressure generating device is connected by a fluid circuit 8 to each of a plurality of hydraulically actuated pneumatic pumps 5 each having a hydraulic chamber 6 and an air chamber 7 separated by a flexible impervious diaphragm 10 fixed in fluid tight relation at its periphery to the internal wall of the cylinder of the pump 5. The air chamber 7 is provided with an inlet check valve 9 opening at its inlet and to atmosphere and an outlet check valve 12. The chamber 16 of cylinder 1 below diaphragm 4, the conduit 8 and the chamber 6 of pumps 5 are all filled completely with an incompressible fluid. Thus, downward movement of the diaphragm 4 will discharge fluid from chamber 16 through the conduit 8 into the chambers 6 of the pumps 5 in parallel and depress the diaphragms 10 thereof from the full line positions as shown to the dotted line positions. Downward movement of the diaphragms 10 will increase the air pressure within chambers 7 to a superatmospheric level, close check valves 9 and open check valves 12 to permit air discharge from chambers 7 at a superatmospheric pressure into the associated fluid lines 17. Conversely, upward movement of diaphragm 4 upon energization of solenoid 3 will reduce the pressure on the incompressible liquid in chamber 16, line 8, and chambers 6 to a subatmospheric level and thereby similarly reduce the air pressures in chambers 7 to close check valves 12 and open check valves 9. By this arrangement, each downward stroke of diaphragm 4 discharges air at a superatmospheric pressure into the lines 17 and each upward stroke of the diaphragm 4 closes off conduits 17 from chamber 7 by closing valves 12 and restores chambers 7 to atmospheric pressure by opening valves 9. Solenoid 3 is alternately energized and de-energized from a conventional electric power source through any suitable alternately opening and closing switch device to produce a cyclical movement of diaphragm 4. The switching device controlling solenoid 3 is preferably adjustable to permit selective variation in the frequency of operation of the diaphragm 4.

The air discharge lines 17 each lead to a generally vertically extending conduit 11 disposed in a separate one of the cells 13 of an associated battery. The top level of the electrolyte in cell 13 is indicated at 14. The lower or inlet end of the conduit 11 is open and disposed adjacent to and in spaced relation from the bottom of the cell to permit electrolyte from the bottom of the cell to enter conduit 11. The top of conduit 11 is open and disposed below and closely adjacent the top surface 14 of the electrolyte. Air line 17 is connected to conduit 11 intermediate its ends slightly below but near the mid point of its height. So long as no air is pumped into line 17 by pumps 5, conduit 11 will be completely filled with electrolyte. When air is forced into conduit 17 through valve 12 by pump 5, air will be expelled from the end of air line 17 into the conduit 11 to form air bubbles 15 which due to their lighter weight than the electrolyte will gradually rise in conduit 11 to its top causing the electrolyte above bubble 15 to be expelled from the top of conduit 11. As air bubbles 15 rise, the liquid pressure at the lower end of conduit 11 tends to decrease to induce flow of electrolyte from the bottom of cell 13. In this manner, the discharge of bubbles into conduit 11 induces electrolyte flow upwardly through conduit 11 and thereby induces downward electrolyte flow between the electrodes throughout the remainder of the cell.

As will be noted from the drawing, bubbles 14 fill the cross section of tube 11 and thereby act as pistons in a pump effecting circulation without noticeably decreasing the density of the electrolyte due to aeration of the electrolyte.

Figure 2:
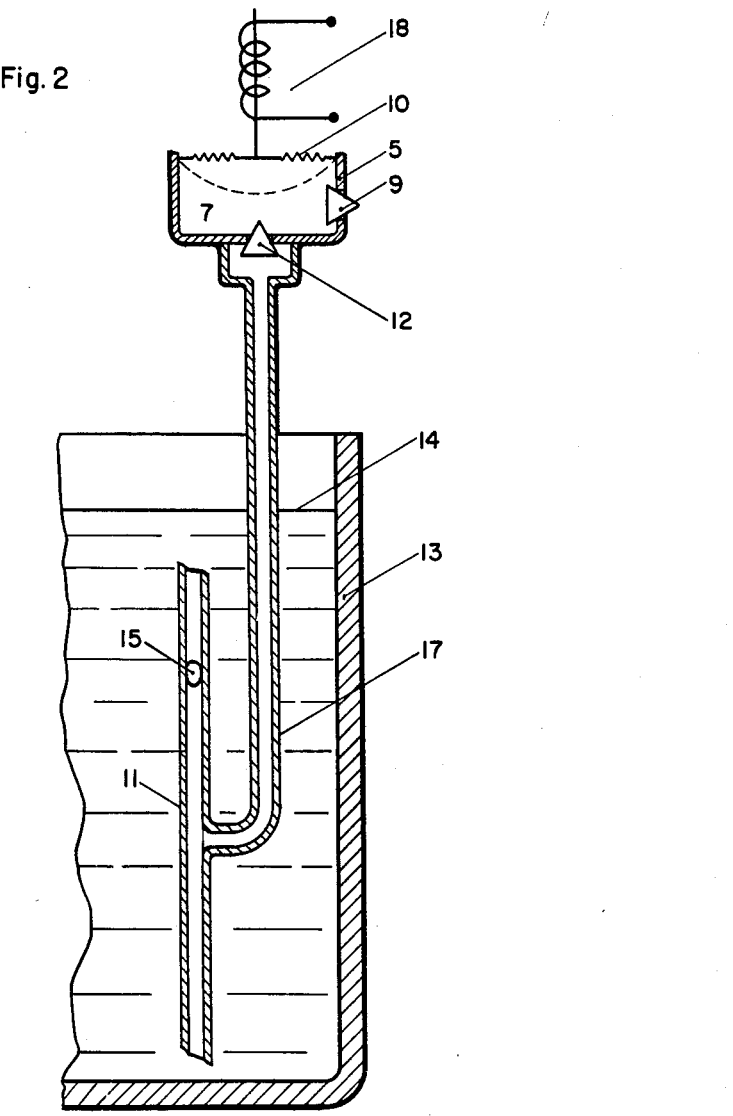
FIGURE 2 is a diagrammatic illustration of a second embodiment of the invention is which a pneumatic pump operatively associated with a cell of a storage battery is provided with direct and individual motor actuation.

In the second embodiment of the invention the main pressure unit is eliminated and each diaphragm 10 in each pumping unit 5 is actuatd by an individual electric driving unit or solenoid motor 18 which is governed by switch of sutable kind in the same manner as described above in reference to solenoid 3 of FIGURE 1. In the embodiment of FIGURE 2, the pump 5 differs from that of FIGURE 1 only in that chamber 6 of the FIGURE 1 embodiment is eliminated and that the core of the solenoid 18 is directly connected to the diaphragm 10, the weight of the core of solenoid 18 alone being sufficient to depress the diaphragm 10 to its dotted line position when solenoid 18 is de-energized. The circulation of air from atmosphere, through valve 9, chamber 7, valve 12, air line 17 and conduit 11 is the same as in the FIGURE 1 embodiment.

The main advantage of the present invention from prior arrangements of this kind is that the air distribution to each storage cell is exactly alike and the distribution of air is easily controlled and adjusted. Moreover, no arrangements for generating or storing of air under pressure are necessary. The pumping effect can be easily adjusted in wide limits by adjusting the frequency and/or the amplitude of movement of the piston 2 and/or the diaphragms 10.

The arrangement as described above and by way of example shown in the accompanying drawing, works in the way that the high specific gravity electrolyte which is near the bottom in a cell container is lifted upawrdly to the upper part of the cell container through the rising air bubbles 15 in the pump tube 11. As a result of its high specific gravity, the electrolyte discharged from the top of tube 11 easily displaces the diluted electrolyte in and between the electrodes to assure uniform circulation. Another important advantage resulting from the present invention is that the uniform thorough electrolyte circulation among the electrodes produces uniform heat ditribution throughout the cell.

Figure 3:
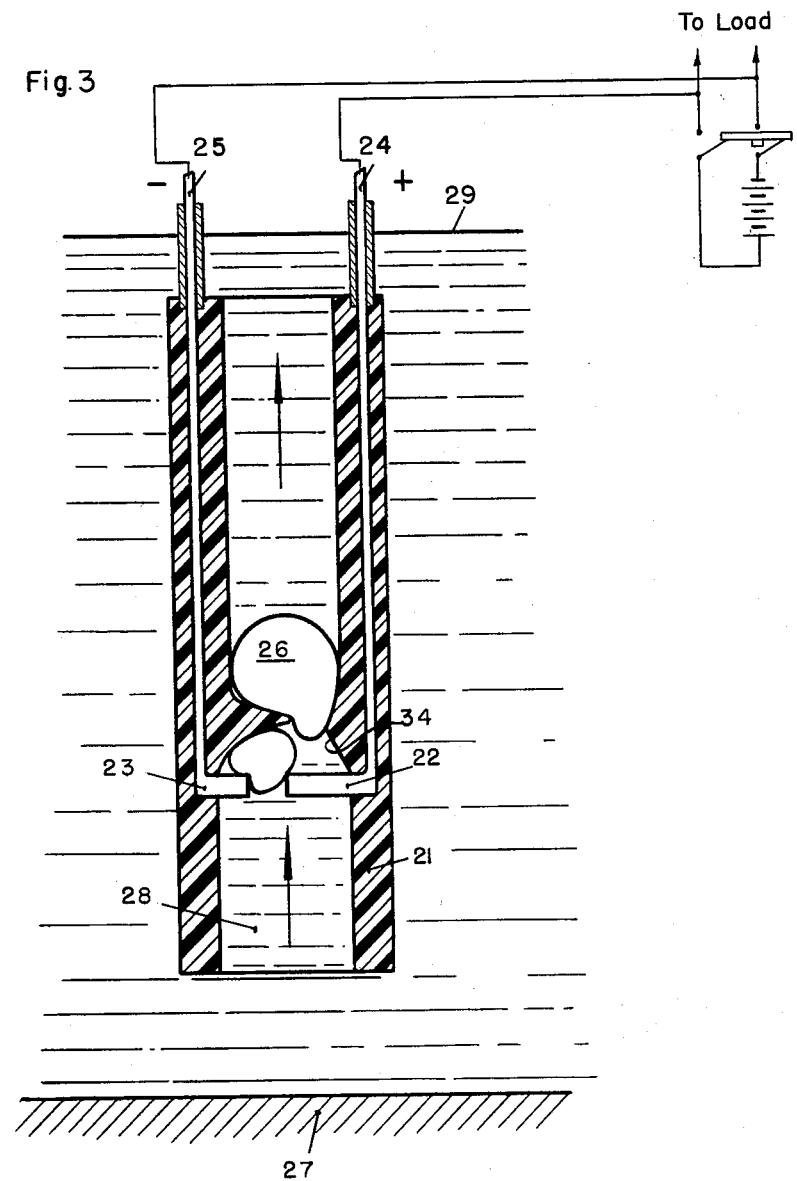
FIGURE 3 is a vertical section through another embodiment of an electrolyte pump in accordance with this invention.

Referring now to FIGURES 3, 4 and 5, the electrolyte may be circulated throughout the cell by a plurality of pumps disposed in a predetermined pattern in the cell and each comprising a conduit or tube 21 of electrical insulating and electrolyte-resistant material.

At a position about one fourth the distance along the length of the tube from the bottom, suitably formed electrodes 22 and 23 are provided on the inner conduit walls. Electrodes 22 and 23 are connected with connection wires 24 and 25 which may be inserted in the tube wall in a liquid-tight manner or otherwise disposed to be suitably insulated against damage from the electrolyte at the parts which are submerged in the electrolyte 28. The connection wires are connected respectively to positive and negative poles of the cell or to a current source outside the cell. In certain cases these wires may be connected to the nearest positive negative electrodes in the cell. When the connection wires are connected to the poles of the cell or to an alternating current transformer or other current source outside the cell, the connections may be provided with a switch so that the electrodes 2 and 3 can be disconnected during, for example, the charging and storage periods, and be connected to the electrolyzing potential only when the battery is being discharged.

As shown in FIGURES 4 and 5 the electric cell may comprise a casing 27, positive electrodes 30, negative electrodes 31, and separators 32. Casing 27 is filled with electrolyte 28 to the level 29 and a plurality of electrolyte pumps 21 are mounted at one end of, and between parts of, the positive plates 10 in a staggered manner.

The electrolyte pumps according to the invention work in the following way. Each tube 21 has its upper opening preferably just below the electrolyte surface 29 and extends to a bit above the container bottom. With current passage through wire 24, electrode 22, electrode 23 and wire 25, the electrolyte between the electrodes 22 and 23 is electrolyzed and gas is developed.

The tube is shaped and electrodes disposed in such a way that a sufficiently large gas bubble 26 is formed which fills the interior of the tube. When the gas bubble loosens and rises upwards in the tube, it lifts the electrolyte above it. Tube 21 is provided with a constriction 14 (FIGURE 3) or is made with a small bore 36 (FIGURE 6) or is formed with its upper part 38 of reduced diameter (FIGURE 7) to produce large separate bubbles which completely fill the cross section of the tube. Consequently heavier electrolyte from the bottom of the cell flows into the tube 21 and proceeds to be pumped to the upper electrolyte surface to effect the desired electrolyte circulation. The necessary electrolyzing power which is used in the pumps is negligible and can, as compared to the self-discharge of the cell, be completely neglected. The cell capacity on the other hand rises considerably.

The arrangement according to the present invention can be formed in many different ways. The circulation arrangement may be placed and arranged in different places in a galvanic cell. By way of example the width of one or more of the electrodes in a galvanic cell may be decreased to such a degree that a circulation arrangement according to the invention can be placed side by side with any or all of the electrodes. Also, it may sometimes be advantageous to provide circulation arrangement according to the invention in each or alternate areas of the electrodes. Where and how many circulation units are to be placed in a galvanic cell depends on the construction and the load conditions of the cell.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of producing electrolyte circulation in a battery having at least one open ended conduit extending from a point closely adjacent but spaced from the bottom thereof to a point adjacent the level of the electrolyte, said method comprising introducing charges of gas into said conduit at a position intermediate its ends and at a rate to cause said charges to form a plurality of unattached bubbles each completely filling the cross sectional area of said conduit with the level of said electrolyte being maintained near the top of said conduit whereby said electrolyte circulates without substantial aeration through said conduit as the bubbles rise therein.

2. The method of claim 1 wherein the charges of gas are introduced by pumping separate charges of air into said conduit.

3. The method of claim 1 where the charges of gas are introduced by effecting electrolysis of the electrolyte by electrical current discharge within the conduit.

4. The method of producing electrolyte circulation to establish a substantially uniform density of the electrolyte in a battery comprising the steps of:
 (a) establishing a vertically extending zone of electrolyte laterally confined by a conduit, the conduit extending to a point near the surface of the electrolyte and being open at its upper end and at a point near the bottom of said vessel; and
 (b) intermittently generating gas flow into the interior of said conduit at a location intermediate its ends to thereby produce separate bubbles each filling the entire cross section of said conduit and causing electrolyte to be circulated upwardly through the conduit by the pumping action of said bubbles without decreasing the density of the electrolyte by aeration.

5. A method of producing electrolyte circulation to establish a substantially uniform electrolyte density in a battery comprising:
 (a) establishing a zone of the electrolyte laterally confined by a conduit at opposite ends which are at a point near but below the surface of the body of electrolyte and a point near the bottom of said vessel;
 (b) producing a pulsating gas flow in the interior of said conduit at a location intermediate its ends to produce bubbles in the zone of electrolyte which in cooperation with the conduit, act as a piston in a pump to thereby cause electrolyte to be circulated upwardly in said conduit due to the pumping action of said bubbles without decreasing the density of the electrolyte by aeration.

6. In combination with a storage battery cell having an electrolyte container and a plurality of closely spaced electrodes disposed therein;
 (a) a conduit disposed wholly within the container having a first opening at one end closely adjacent and spaced from the bottom thereof and a second opening adjacent the top of the container;
 (b) means for inducing electrolyte flow in said conduit comprising electrode means on the inside walls of said conduit for forming bubbles by electrolysis of the electrolyte, the size of individual bubbles being sufficiently large to completely fill the cross section of the conduit to thereby effect a pumping action without causing aeration of the electrolyte whereby high specific gravity electrolyte is withdrawn from the bottom of the container and discharged near the top thereof to produce electrolyte circulation between the electrodes of said cell,
 (c) said conduit containing a constriction therein shaped to cause accumulation of the gas resulting from electrolysis to form into bubbles completely filling the cross section of said conduit.

7. In combination with a storage battery cell having an electrolyte cell container and a plurality of closely spaced electrodes disposed therein, a conduit disposed wholly within the container having a first opening at one end closely adjacent and spaced from the bottom thereof and a second opening adjacent the top of the container, said conduit comprising a tube shaped body of electrical insulating electrolyte-resistant material with a pair of spaced electrodes mounted in said body and having facing surfaces on opposite walls of said duct at a location between the inlet and outlet together with means for applying an electrical potential between said electrodes to cause electrolysis to take place in said electrolyte and gas bubbles to be formed in the duct in said tubular conduit, the interior walls of said tubular conduit including a constriction between the position of said electrodes and said outlet opening whereby only one bubble at a time can pass said constriction, said electrodes and means for applying an electrical potential between said electrodes being adapted to produce pulsating charges of gas in said conduit to form said gas bubbles, the size of individual bubbles being sufficiently large to completely fill the cross section of the conduit to thereby effect a pumping action, but without causing aeration of the electrolyte whereby high specific gravity electrolyte is withdrawn from the bottom of the container and discharged near the top thereof to produce electrolyte circulation between the electrodes of said cell.

8. In combination with a storage battery cell having an electrolyte container and a plurality of closely spaced electrodes disposed therein, a conduit disposed wholly within the container having a first opening at one end closely adjacent and spaced from the bottom thereof and a second opening adjacent the top of the container, and means for inducing electrolyte flow in said conduit from said first opening to said second opening including means for producing pulsating charges of gas in said conduit which form bubbles, the size of individual bubbles being sufficiently large to completely fill the cross section of the conduit to thereby affect the pumping action without causing aeration of the electrolyte whereby high specific gravity electrolyte is withdrawn from the bottom of the container and discharged near the top thereof to produce electrolyte circulation between the electrodes of said cell, said conduit comprising a tube shaped body of electrical insulating electrolyte-resistant material and said means for inducing electrolyte flow in said conduit comprising electrodes mounted in said body and having facing surfaces on opposite walls of said conduit at a location between the inlet and outlet together with means for applying an electrical potential between said electrodes to cause electrolysis to take place in said electrolyte and gas bubbles to be formed in said conduit, the interior wall of said tubular conduit above the position of said electrodes being of reduced cross sectional area relative to the cross sectional area below said electrodes and of such size as to permit passage of one gas bubble at a time therethrough to thereby affect said pumping action.

References Cited in the file of this patent

UNITED STATES PATENTS

| | | |
|---|---|---|
| 1,343,693 | Thomas | June 15, 1920 |
| 1,992,310 | Hultman | Feb. 26, 1935 |
| 2,441,084 | Scattergood | May 4, 1948 |
| 2,584,117 | Elrod | Feb. 5, 1952 |